Sept. 8, 1925.

A. E. OSBORN

REVERSE GEARING

Original Filed Aug. 24, 1922  3 Sheets-Sheet 1

INVENTOR
Alden E. Osborn

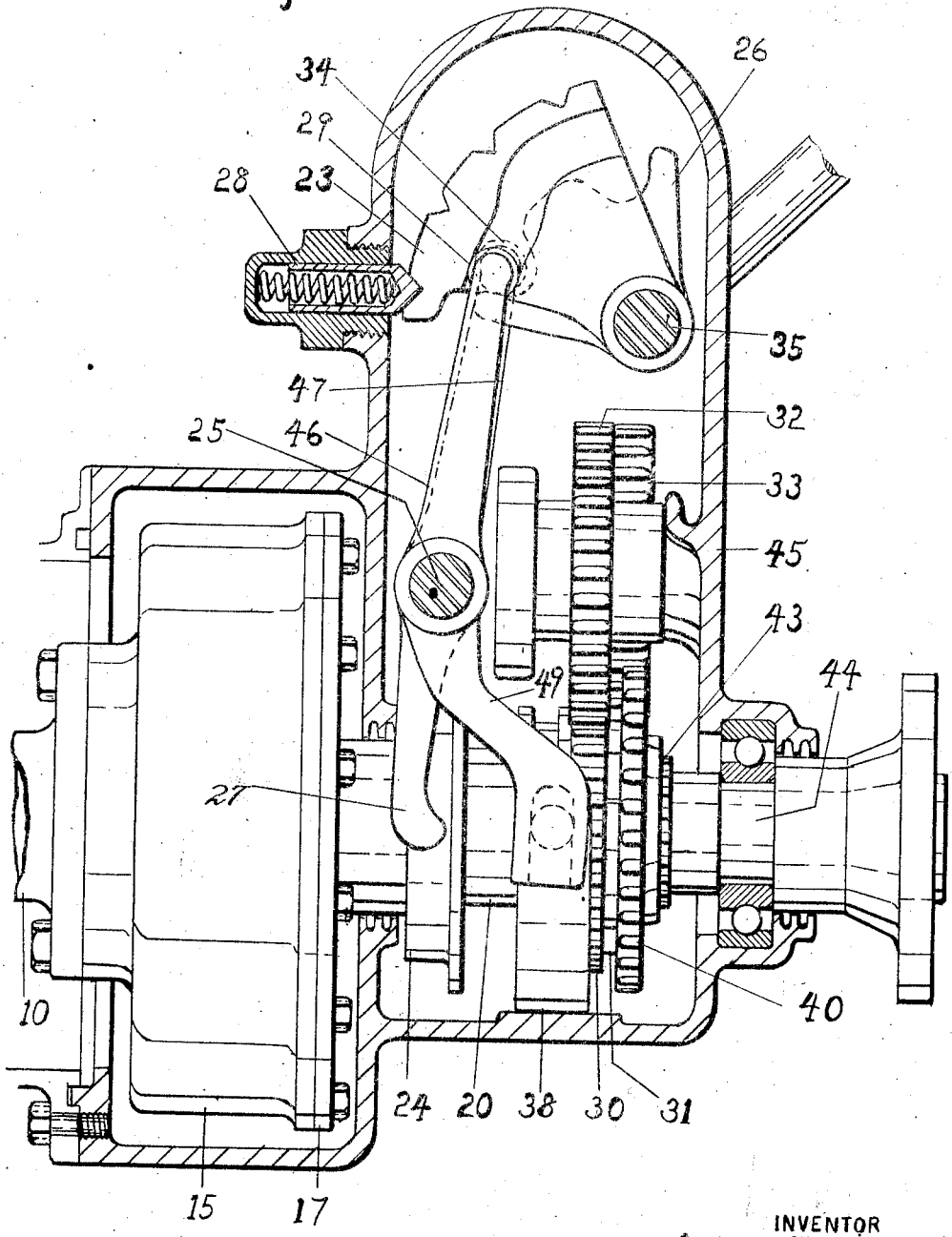

Sept. 8, 1925.
A. E. OSBORN
REVERSE GEARING
Original Filed Aug. 24, 1922    3 Sheets-Sheet 3
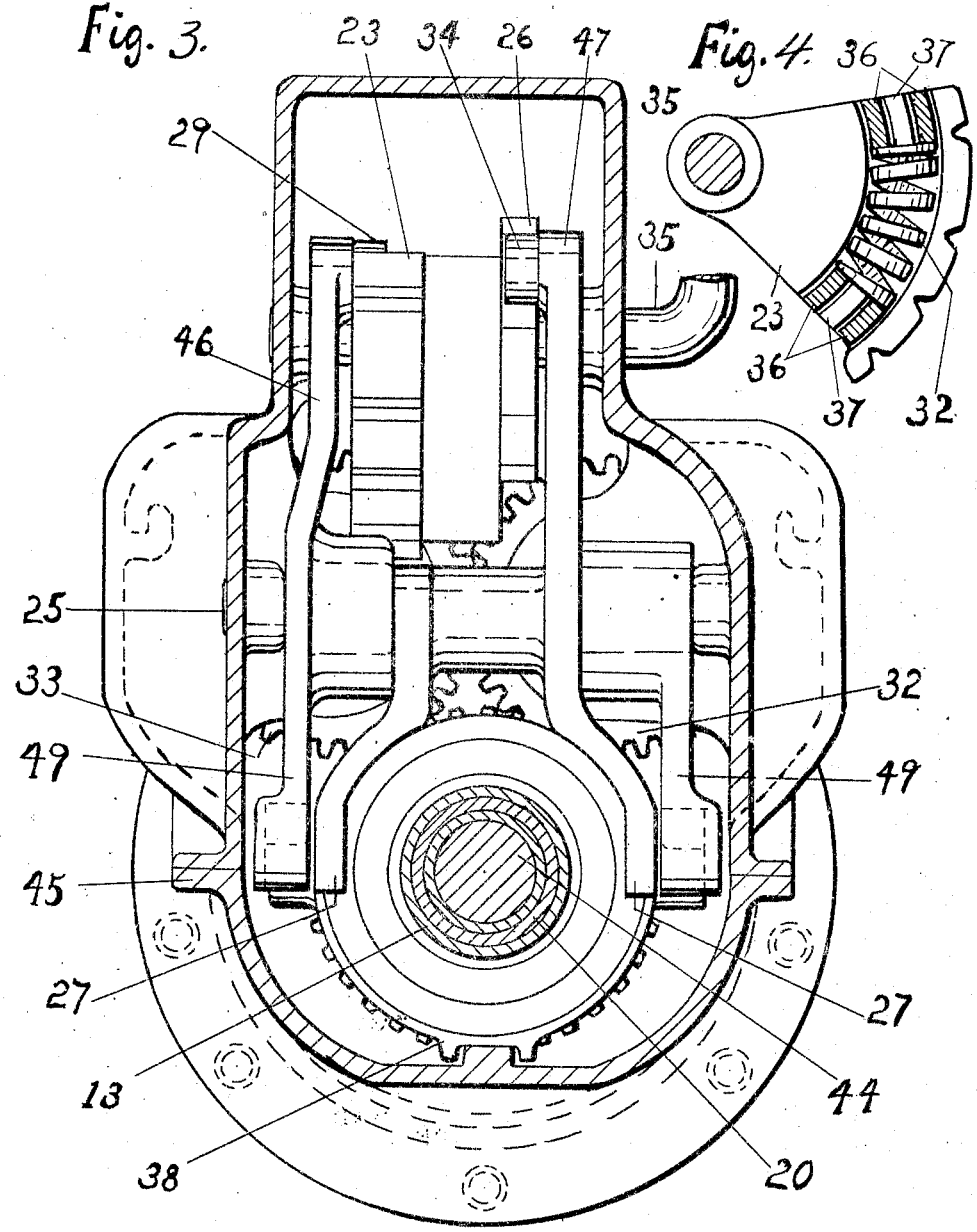
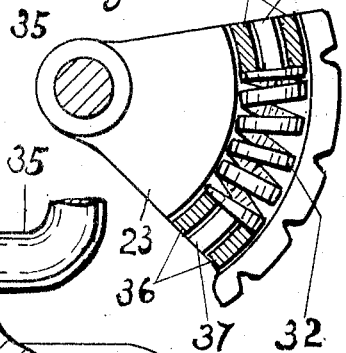
INVENTOR
Alden E. Osborn Patented Sept. 8, 1925.

1,552,873

UNITED STATES PATENT OFFICE.

ALDEN E. OSBORN, OF NEW YORK, N. Y.

REVERSE GEARING.

Application filed August 24, 1922, Serial No. 584,082. Renewed April 13, 1925.

*To all whom it may concern:*

Be it known that I, ALDEN E. OSBORN, a citizen of the United States of America, and a resident of New York, county of the Bronx, and State of New York, have invented certain new and useful Improvements in Reverse Gearing, of which the following is a specification.

This invention relates to a reverse gearing of a type in which a sliding gear is employed and which operates upon the principle disclosed in my patent for reverse gearing No. 1,441,520, issued Jan. 9, 1923, but embodies certain improvements over the mechanism disclosed in that application which enables the device to be arranged in a more compact form. It also relates to certain improvements in the arrangement of the operating levers for controlling the clutch and sliding the gears. It also provides for a clutch of the conventional spring operated type similar to that used on automobiles and without the clutch dog levers that are employed with the form of clutch illustrated in my above-mentioned patent.

In the accompanying drawings, I have for the purpose of disclosure, illustrated my invention embodied in one form only, but would have it understood that it is susceptible of embodiment in other forms without departure from the true spirit and scope of the invention as defined in the appended claims. In the drawings:

Figure 2 represents a longitudinal partial sectional view of the mechanism shown in Figure 1, with the parts in a position to give the reverse.

Figure 3 represents a cross-sectional view of my invention taken on the line 2—2 of Figure 1 and, Figure 4 represents a partial sectional view of the spring mechanism between the operating lever and the gear controlling cam.

Similar numerals of reference indicate similar parts throughout the several views.

Figure 1:
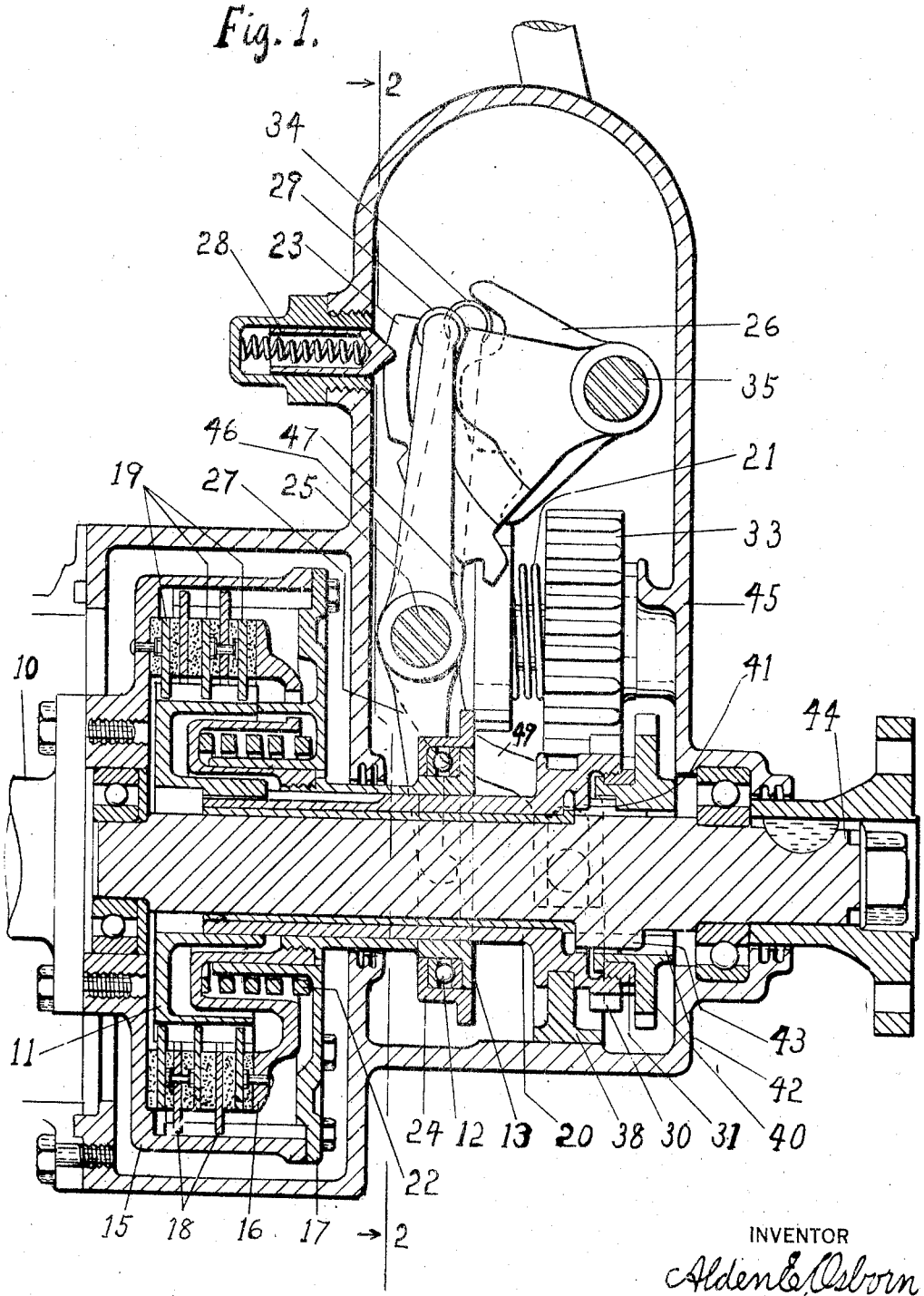
Figure 1 represents a longitudinal sectional view of my invention.

Referring to Figure 1, 10 indicates the shaft of the engine or other driving device which primary driving shaft carries the fly-wheel or clutch casing 15. This casing 15 contains a friction clutch adapted to connect or disconnect, as required, the main driving sleeve or element 20 with the primary driving shaft 10 just referred to.

The friction clutch is shown as of the multiple disc type and comprises the driving discs 18 engaging keyways in the clutch casing 15 and the driven discs 19 engaging keyways or teeth on the driven drum 11 of the clutch. These discs are normally pressed together by the spring 22 between the plate 16 and cover 17 so that the driven member 11 would receive motion from the primary driving shaft 10. In order to release the clutch the sleeve 13 is connected to the plate 16 and extends within the gear casing 45 and is arranged to be moved longitudinally by means of the collar 24 which is shown as acting on this clutch sleeve 13 thru the medium of a ball thrust bearing 12. The construction of the clutch may, of course, be modified as this does not form a part of my invention, but I prefer, however, that it be of such a form that the clutch sleeve 13, to control its action, can be extended to within the gear casing 45 in order that the parts for moving this sleeve can be enclosed within the casing. The type of clutch shown, in which the parts are normally engaged by means of a spring, can be made without the need of a special adjustment for wear because a sufficient allowance can be made in the length of the spring travel to take up for any wear that may occur thus making it possible to eliminate all adjustments from a reverse gear of this type. The driven drum 11 of the clutch is arranged so that it can drive the driving sleeve 20 and at the same time allow the sleeve to have a longitudinal movement on the driven shaft or element 44 of the gear. This sleeve 20 carries the driving gear 30 and can be given its longitudinal movement, just referred to, thru the medium of the collar 38. The sleeve also carries one member 41 of the jaw clutch or internal gear clutch which is arranged to engage with suitable clutch teeth 43 on the driven element 44 so that the sleeve 20 would be locked to this element 44 when these clutch teeth 41 and 43 are in mesh. The driven element 44 also carries the driven gear 40 which is arranged so that it can be longitudinally slid, thru the medium of the nut 31 threaded into the sleeve 20, on the element 44 while also rotatably connected to that element by suitable internal teeth or keys 42 that engage with the teeth or keys 43 on the element 44. The gear 30 is arranged so that it can be brought into mesh with the intermediate gear 32 (see Figs. 2 and 3), rotatably carried by the casing 45 while the gear 40 can be brought into mesh with the gear 33 also rotatably carried by the casing 45 and intermeshed with the gear 32 so that when the driving gear 30 is rotated, the driven gear 40 would be caused to turn thru the action of these two intermediate gears in a reverse direction to the directon to the rotation of the driving gear and would therefore turn the driven member 44 in a reverse direction also to the direction of rotation of the sleeve 20. In order to slide the gears 30 and 40 from the position in which they are shown to that which would bring them in mesh with the intermediate gears 32 and 33, I have provided levers 49 which act upon the collar 38 and are actuated by means of the lever 46 and cam roller 29 which engages cam 23 on the manually operated control lever shaft 35. This control lever shaft also carries the cam 26 (partially shown by dotted lines in Figs. 1 and 2) which cam serves to operate the clutch thru the medium of the roller 34 and levers 27 and 47 in such a way that the clutch would be fully engaged with the parts in the position shown and the manually operated control lever shaft 35 turned to one extreme of its travel and so that by moving this shaft a little back from this extreme the cam 26 would release the clutch allowing the primary driving shaft 10 to turn freely. A still further backward movement of the control lever shaft 35 would by moving the cam 23 cause the gears 30 and 40 to be moved longitudinally and disengage the clutch teeth 41 on the sleeve 20 from the clutch teeth or keys 43 on the driven element 44 and to thereafter engage the gears 30 and 40 with the gears 32 and 33 on the casing 45. A further movement of the control lever will cause the cam 26 to allow the engagement of the friction clutch thru releasing the disengaging pressure against the clutch spring 22. The parts are now in the position in which they are shown in Figure 2 and the driven element 44 would turn in the opposite direction to that in which the driving element 10 turns. It will be seen that when shifting the gears or the clutch teeth in or out of mesh the friction clutch would automatically disengage the primary driving shaft 10 from the clutch drum 11 and thus enable the meshing of the gear or clutch teeth when the parts were not in motion. In order to permit the engagement of the clutch teeth or of the teeth on the gears when their ends happen to come in line and it is desired to engage one or the other, a suitable spring is incorporated in the mechanism at some point between the manually operated control shaft 35 in the connection between that shaft and the gear 30. This spring would enable the clutch controlling cam to be rotated and allow of the engagement of the clutch, notwithstanding the fact that the shifting collar 38 would be prevented from the required movement by the teeth being in line, and thus, by causing the primary driving shaft 10 to rotate the driven sleeve 20, bring the teeth that are in line into a position where they could drop into mesh and assume the proper relation for transmitting the drive when the clutch is reengaged. Another object of this spring would be to permit the release of the clutch, when the parts are under so great a driving pressure that the sleeve could not be moved without too great an effort on the control lever as the spring would then compress and allow the clutch control cam to rotate to an extent sufficient to disengage the clutch and thus relieve the parts of pressure.

In Figure 4 of the accompanying drawings I have shown one way of arranging these springs in detail but would point out that it need not be placed in any special position in the control connection provided of course, that it performs the functions above set forth properly. In this figure the spring 32 is of a curved spiral type and is arranged between the four projections 36 connected to the control lever shaft or clutch controlling cam 26 and the two projections 37 connected to the cam 23 so that, when this cam is held from motion, the spring 32 could compress in either direction and allow for the rotation of the control lever shaft 35 and of the clutch controlling cam 26. In order to hold the controlling lever in the proper position to give the required forward or reverse motion to the driven element 44 or to maintain the lever in the neutral positions, I have shown a spring operated plunger 28 in the casing 45 which engages with suitable notches on the exterior of the cam 23. I have shown a spring 21 at the back of the casing gear 33, the object of which is to normally hold the gear in the position in which it is shown but to allow the gear to slide longitudinally on its shaft should the gear 40 come into engagement with this gear 33 with the ends of the gear teeth abutting. This permits the gear 33 to move a sufficient extent to allow the gears 30 and 32 to come into mesh and thus when the clutch has been engaged rotate the gears 30, 32 and 33 so that the gear 40 can be meshed with the gear 33.

The arrangement of the clutch and gear operating levers and the cams as well as the position of the two intermediate gears will be clearly understood by reference to Figure 2.

It will be noticed that both the levers controlling the clutch and the levers controlling the shifting of the gear are mounted to swing about the shaft 25 but it should be understood that they may be pivoted in the casing on separate shafts if it is desired.

Having thus described my invention, I claim as new and desire to secure by Letters Patent:—

1. In a transmission gearing the combination of a primary driving member, a driving element, and a driven element, a friction clutch adapted to connect said primary driving member and said driving element, a longitudinally slidable gear, a stationary frame, a gear rotatably mounted on said stationary frame and also longitudinal slidable, connections to the first named gear to longitudinally slide said gear and to operate said friction clutch whereby, when said gear is slid into mesh with the said stationary frame gear, the clutch is released, and whereby said clutch is reengaged when said gears are in mesh, and means for enabling the meshing of the teeth on said gears, when the ends of said teeth abut, comprising an elastic element permitting the longitudinal sliding of said stationary frame gear whereby said clutch can be engaged by permitting the longitudinal movement of the first named gear and one of the said gears with the abutting gear teeth rotated to bring the said gear teeth into a position where they can be meshed by the elastic element returning said stationary frame gear to its normal position.

2. In a transmission gearing the combination of a primary driving member, a driving element, and a driven element, a friction clutch adapted to connect said primary driving member and said driving element, a longitudinally slidable gear connected to the driving element, a longitudinally slidable gear connected to the driven element, a stationary frame, a gear rotatably mounted on said stationary frame and also longitudinally slidable, connections to the longitudinally slidable gear on the driven element and to the friction clutch to slide said driven element gear and to operate said friction clutch whereby, when said driven element gear is slid into mesh with the stationary frame gear, the clutch is released and whereby said clutch is reengaged when said gears are in mesh, and means for enabling the meshing of the teeth of said gears when the ends of said teeth abut, comprising an elastic element adapted to usually maintain said stationary frame gear in its normal position longitudinally but permitting the longitudinal sliding of said stationary frame gear whereby said clutch can be engaged by permitting the longitudinal movement of the said driven element gear and one of the said gears rotated to bring the said gear teeth into a position where they can be meshed by the said elastic element returning said stationary frame gear to its normal position.

3. In a transmission gearing the combination of a primary driving member, a driving element, and a driven element, a longitudinally slidable gear connected to the driving element, a longitudinally slidable gear connected to the driven element and slidable with the first named gear, a shifting collar adapted to longitudinally slide said gears, and means, connected with said collar for shifting said gears longitudinally, comprising a cam acting on said collar, and a manually operated shaft connected with said cam thru an elastic element whereby said manually operated shaft can be rotated should the longitudinally slidable gears be detained from free movement.

4. In a transmission gearing the combination of a primary driving member, a driving element, and a driven element, a longitudinally slidable gear connected to the driving element, a longitudinally slidable gear connected to the driven element and slidable with the first named gear, a shifting collar adapted to slide said gears, a friction clutch adapted to connect or disconnect said primary driving member and said driving element, a manually operated shaft, means for connecting said shaft with said friction clutch to operate said friction clutch, means for shifting said gears longitudinally, connected with the said collar and comprising a cam acting on said collar and having connection with said manually operated shaft thru an elastic element whereby said manually operated shaft can be rotated should the longitudinally slidable gears be detained from free movement, to control the engagement of said friction clutch.

5. In a transmission gearing the combination of a primary driving member, a driving element, and a driven element, a friction clutch adapted to connect or disconnect said primary driving member and said driving element, a longitudinally slidable gear connected to the driving element, a longitudinally slidable gear connected to the driven element and slidable with the first named gear, a shifting collar adapted to slide said gears, a longitudinally slidable clutch sleeve, a spring adapted to move said sleeve in one direction to normally engage said clutch, a manually operated shaft, means for connecting said shaft with said sleeve to longitudinally slide said sleeve against the action of said spring to disengage said friction clutch, means for shifting said longitudinally slidable gears connected with said gear shifting collar and comprising a cam acting on said collar and having connection with said manually operated shaft thru an elastic element whereby said manually operated shaft can be rotated should the longitudinally slidable gears be detained from free movement, to control the engagement or disengagement of said friction clutch thru the action of its said connections to the clutch operating sleeve.

6. In a transmission gearing the combination of a primary driving member, a driving element, and a driven element, a stationary casing, a friction clutch outside of said casing adapted to connect said primary driving member and said driving element, a collar within said casing to control the action of the clutch, a longitudinally slidable gear within said casing, a collar adapted to control the position of said gear also within said casing, a manually operated shaft and means for operating said collars from said manually operated shaft comprising two cams on said shaft, and means also within the casing for connecting said cams with said collars to operate said collars thru the rotation of said cams.

7. In a transmission gearing the combination of a primary driving member, a driving element, and a driven element, a stationary casing, a friction clutch outside of said casing adapted to connect said primary driving member and said driving element, a longitudinally slidable gear within said casing, collars within said casing to control the action of the clutch and the longitudinal position of said gear, a manually operated shaft extending within the casing, and means for operating said collars from said shaft comprising two cams on said manually operated shaft, and means also within the casing for connecting said cams with said collars to operate said collars thru the rotation of said manually operated shaft and a notch sector also within said casing and on said manually operated shaft, and a spring operated plunger engaging the notch sector to maintain the operating lever in certain positions.

8. In a transmission gearing the combination of a primary driving member, a driving element and a driven element, a friction clutch adapted to connect said primary driving member with said driving element, a positive clutch having a movable element and adapted to connect or disconnect said driving element and said driven element by the movement of its said movable element, a manually operated control shaft, means for connecting said control shaft with said friction clutch to engage said friction clutch when said control shaft is in one position and disengage said friction clutch when said control shaft is in another position, and means for connecting said control shaft with the movable element of said positive clutch to maintain said movable element substantially stationary when said control shaft is being moved from one to the other of the aforesaid positions, and to only move said movable positive clutch element when said control shaft is being moved to still another position beyond the position of disengagement of said friction clutch.

9. In a transmission gearing the combination of a primary driving member, a driving element, and a driven element, a friction clutch adapted to connect or disconnect said primary driving member and said driving element, a gear connected to one of said elements, a gear connected to the other of said elements, and adapted to be engaged or disengaged from said first mentioned gear, a manually operated control shaft, means for connecting said control shaft with said friction clutch to engage said friction clutch when said control shaft is in one position and disengage said friction clutch when said control shaft is in another position, means for connecting said control shaft with said engageable gear to maintain said gear substantially stationary and in mesh with the other said gear when said control shaft is being moved from one to the other of the aforesaid positions and to only move said gear when said control shaft is being moved to still another position beyond the position of disengagement of said friction clutch.

10. In a transmission gearing the combination of a primary driving member, a driving element, and a driven element, a friction clutch adapted to connect or disconnect said primary member and said driving element, a gear connected to the driving element, a gear connected to the driven element, means for engaging or disengaging said gears by the longitudinal sliding of one of said gears, a manually operated control shaft, means for connecting said control shaft to said friction clutch to engage said clutch when said control shaft is in one position and disengage said clutch when said control shaft is in another position, and means for connecting said control shaft with said longitudinally slidable gear to maintain said slidable gear substantially stationary when said control shaft is moved from one to the other of the aforesaid positions and to only move said gear when said control shaft is being moved to still another position beyond the position of disengagement of said friction clutch.

11. In a transmission gearing the combination of a primary driving member, a driving element and a driven element, a friction clutch adapted to connect or disconnect said primary driving member and said driving element, a positive clutch adapted to connect or disconnect said driving element and said driven element, a manually operated control shaft, means for connecting said control shaft with said friction clutch comprising as one of its elements a cam to cause said clutch to be engaged when said control shaft is in one position and disengaged when said control shaft is in another position, and means for connecting said control shaft with said positive clutch whereby said positive clutch is substantially fully engaged when said control shaft is in both of the aforesaid positions and whereby a movement of said control shaft to still another position, beyond the position of disengagement of said friction clutch, withdraws the teeth of said positive clutch from engagement.

12. In a transmission gearing the combination of a primary driving member, a driving element, and a driven element, a friction clutch adapted to connect or disconnect said primary driving member and said driving element, a positive clutch adapted to connect or disconnect said driving element and said driven element, a gear connected to the driving element, a gear connected to the driven element and adapted to be engaged or disengaged from said gear connected to the driving element, a manually operated control shaft, means for connecting said control shaft with said friction clutch to engage said clutch when said control shaft is in one position, and disengage said clutch when said control shaft is in another position, means for connecting said control shaft to said positive clutch to maintain said positive clutch substantially stationary when said control shaft is being moved from one to the other of the aforesaid positions, and to only move said positive clutch when said control shaft is being moved to another position beyond the position of disengagement of said friction clutch, said means also, upon a still further movement of said control shaft withdrawing said positive clutch from engagement and meshing said gears, and means for reengaging said friction clutch upon a still further movement of said control shaft.

13. In a transmission gearing the combination of a primary driving member, a driving element, and a driven element, a friction clutch adapted to connect or disconnect said primary driving member and said driving element, a positive clutch adapted to connect or disconnect said driving element and said driven element, a manually operated control shaft, means for connecting said control shaft with said friction clutch whereby said clutch is engaged when said control shaft is in one position and disengaged when said control shaft is in another position, means for connecting said control shaft with said positive clutch whereby said positive clutch is substantially fully engaged when said control shaft is in both of the aforesaid positions and whereby a movement of said control shaft to still another position, beyond the position of disengagement of said friction clutch, withdraws the teeth of said positive clutch and an elastic element within the connecting means between the control shaft and positive clutch to allow the movement of the friction clutch operating means to reengage said friction clutch should said positive clutch be detained from free operation.

14. In a transmission gearing the combination of a primary driving member, a driving element and a driven element, a friction clutch adapted to connect or disconnect said primary driving member and said driving element, a positive clutch adapted to connect or disconnect said driving element and said driven element, a manually operated control shaft, means for connecting said control shaft with said friction clutch whereby said clutch is engaged when said control shaft is in one position and disengaged when said control shaft is in another position, means for connecting said control shaft with said positive clutch whereby said positive clutch is substantially fully engaged when said control shaft is in both of the aforesaid positions and whereby a movement of said control shaft to still another position beyond, the position of disengagement of said friction clutch, withdraws the teeth of said positive clutch and an elastic element within the connecting means between the control shaft and positive clutch to allow the movement of the friction clutch operating means to release said friction clutch should said positive clutch be detained from free operation.

15. In a transmission gearing the combination of a primary driving member, a driving element, and a driven element, a friction clutch adapted to connect or disconnect said primary driving member and said driving element, a gear connected to the driving element, a gear connected to the driven element and adapted to be meshed with or unmeshed from said gear connected to the driving element, a manually operated control shaft, means for connecting said control shaft with said friction clutch whereby said friction clutch is engaged when said control shaft is in one position and disengaged when said control shaft is in another position, and means for connecting said control shaft with one of said gears whereby the teeth of said gears are substantially fully engaged when said control shaft is in both of the aforesaid positions and whereby a movement of said control shaft to still another position, beyond the position of the disengagement of said friction clutch, withdraws the teeth of said gears from mesh, and an elastic element to permit the movement of one of the said gears to allow the friction clutch operating means to act to reengage said friction clutch should said gear teeth be detained from meshing.

In witness whereof, I have hereto set my hand this 22nd day of August, 1922.

ALDEN E. OSBORN.